(12) United States Patent
Orr

(10) Patent No.: US 7,333,665 B2
(45) Date of Patent: Feb. 19, 2008

(54) OPTIMAL FILTER-BANK WAVELET MODULATION

(75) Inventor: David E. Orr, Vancouver, WA (US)

(73) Assignee: Xtendwave, Inc., Dallas, TX (US)

( * ) Notice: Subject to any disclaimer, the term of this patent is extended or adjusted under 35 U.S.C. 154(b) by 387 days.

(21) Appl. No.: 10/876,269

(22) Filed: Jun. 23, 2004

(65) Prior Publication Data

US 2005/0286788 A1    Dec. 29, 2005

(51) Int. Cl.
*G06K 9/00* (2006.01)
(52) U.S. Cl. ..................... 382/240; 382/232
(58) Field of Classification Search .............. 382/232, 382/240; 708/322, 316, 319, 300, 400; 375/222, 375/219, 220, 265, 240.19, 340; 329/319, 329/320
See application file for complete search history.

(56) References Cited

U.S. PATENT DOCUMENTS

| | | | | |
|---|---|---|---|---|
| 5,926,791 A | | 7/1999 | Agata et al. | 704/500 |
| 5,995,539 A | * | 11/1999 | Miller | 375/222 |
| 6,332,043 B1 | | 12/2001 | Ogata | 382/240 |
| 6,581,081 B1 | * | 6/2003 | Messerly et al. | 708/322 |
| 6,909,808 B2 | | 6/2005 | Stanek | 382/232 |
| 6,961,742 B2 | * | 11/2005 | Neretti et al. | 708/300 |

OTHER PUBLICATIONS

Aristocratis, Fotakis; Office Action Summary, Mar. 7, 2007; U.S. Appl. No. 10/756,197.

* cited by examiner

*Primary Examiner*—Anh Hong Do
(74) *Attorney, Agent, or Firm*—Merchant & Gould PC; Stanley J. Gradisar

(57) ABSTRACT

A method for encoding, transmitting, and receiving signals utilizes adaptive wavelet packet trees. A transmitter accepts a binary data stream assumed to be random. At the transmitter the data is parsed from a serial bit stream into several parallel streams. Within each of the parallel bit streams symbols are formed from the bits. Signals are created from each symbol by up-sampling. These signals modulate low-pass and high-pass filters that are derived from a wavelet packet transform (the wavelet and scaling functions, or, equivalently the low-pass and high-pass analysis filters). The filters are paired—one high-pass with one low-pass. The steps recited above are recursively repeated $\log_2 N$ times for a signal of length N. The resulting signal is transmitted to the receiver. At the receiver, the steps recited above are reversed at the receiver to recover symbols, with the up-sampled signal down-sampled to remove inserted zeroes.

17 Claims, 5 Drawing Sheets

*P* – prediction operator; *U* – update operator; *P* and *U* may be linear or non-linear

OPTIMAL FILTER-BANK WAVELET MODULATION

FIELD OF THE INVENTION

This disclosure relates to the art of telecommunications systems; more specifically it relates to the use of modulation of orthogonal or bi-orthogonal waveforms generated by filter banks, and even more specifically it relates to optimal generation of waveforms for signal transmission using wavelet packets, wherein base signals are selected from the packet tree based upon an assessment of the impulse response of the communications channel.

BACKGROUND

The demand for high-speed communications is growing exponentially. Therefore new systems and methods for increasing the speed and distance of transmission of information is needed.

SUMMARY

The present invention comprises an apparatus and method for using wavelet filters computed from a wavelet packet tree as a means of encoding, transmitting, receiving and decoding communications signals on multiple parallel frequency channels. The method of encoding and decoding has been found to achieve very high transmission rates for random data over great distances.

In a first aspect a transmitter accepts a binary data stream, assumed to be random. At the transmitter: (1) the data is parsed from a serial bit stream to several parallel streams. The number of bits per symbol need not remain constant; (2) within each of the parallel bit streams symbols are formed from the bits and consist of the set $\{0, 1, \ldots 2k-1\}$ where k is the number of bits per symbol. The symbols are Grey coded to decrease the probability of a bit error, however other forms of pre-coding can be used. (3)[a] Signals are created from each symbol by, first, up-sampling—by inserting zeros between successive symbols; [b] these signals modulate low-pass and high-pass filters that are derived from a wavelet packet transform (the wavelet and scaling functions, or, equivalently the low-pass and high-pass analysis filters). [c] The filters are paired: one high-pass with a low-pass. The ordering is alternated to preserve "natural" frequency ordering. (4) The steps 3[a], 3[b] and 3[c] are recursively repeated $\log_2 N$ times for a signal of length N. The resulting signal is transmitted either in the base band or is transmitted by modulating the carrier of the transmission system. At the receiver; (1) Steps 1 through 3 are reversed at the receiver to recover symbols, with the up-sampled signal down-sampled to remove inserted zeroes. Symbol decisions are made using methods that increase the probability of a correct decision.

In a second aspect of the invention, bits are allocated to modulate filters generated by the wavelet packet tree. In one embodiment, bits are allocated to filters generated from the wavelet packet tree according to the impulse response of the channel.

In a third aspect of the invention, filters are selected from the wavelet packet tree for modulation by the data stream, by selectively assigning bits (energy) to specific filters in the wavelet packet tree. In one embodiment, filters are selected from the wavelet packet tree according to the impulse response of the channel.

In a fourth aspect of the invention, wavelet filters are generated according to the channel used for transmission. In one embodiment, filters for the wavelet packet tree are generated according to the impulse response of the channel.

DETAILED DESCRIPTION

Wavelet Transform

The wavelet transform is a mathematical tool for expressing functions, operators, or data in terms of time or spatial components having different frequencies, permitting one to analyze each component separately. The term wavelet was itself coined in 1982, by the French geophysicist Morlet. Wavelet analysis may be thought of as a general analysis technique using Hilbert space methods, wherein one forms an orthogonal basis of the space of interest. Equations in that space may then be solved in terms of the basis.

Filter Banks

Figure 1:
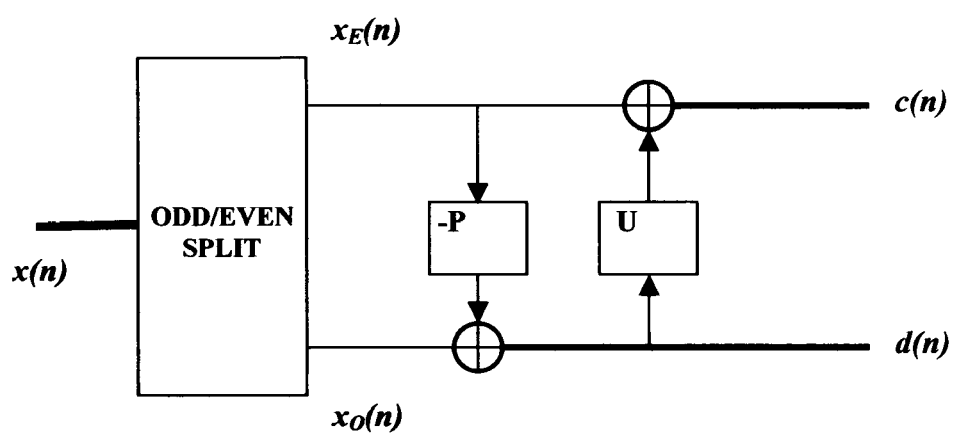
FIG. 1 depicts the first stage of a filter bank, which is utilized in a wavelet packet tree.

With reference to FIG. 1, a filter-bank is a mathematical representation and model of actual physical filters used in signal processing; filter banks model filters responding to and interacting with certain aspects of a signal.

Certain kinds of filter banks—"quadrature mirror filters"—have desirable properties for representing signal processing, wherein signals represented by these filter banks can be compressed and perfectly reconstructed. These filters are also associated with certain wavelets, which are derived from filters using the "cascade algorithm".

The one-dimensional discrete wavelet transform DWT represents a real-valued discrete-time signal in terms of shifts and dilations of a low-pass filter or scaling function and a band-pass wavelet function. The DWT decomposition (DWTD) of a signal is multi-scale: at stage j the DWTD decomposes a signal into a set of scaling coefficients $c^j(n)$, where n is the sample number of the signal, and represents coarse signal information or coarse detail at the scale level j; and the set of wavelet coefficients, $d^j(n)$, which represents "fine" detail of the signal at the scale j; the signal is recursively decomposed into the two sets of coefficients for scales j=1, 2, 3 . . . N.

The inverse DWT (DWTR) employs inverse filters to reconstruct the signal from the sets of coefficients.

A DWTD may be implemented as a predictor-corrector decomposition, in which the scaling coefficients at scale level j are used as predictors for the signal at the next higher or finer level of detail at scale j+1. Wavelet coefficients are the prediction errors between the scaling coefficients and the higher-level signal details the scaling coefficients predict. This interpretation of the DWTD leads to the concept of wavelet decomposition by lifting.

The term "lifting" applies to the process of starting with an elementary wavelet and mathematically "lifting the wavelet" to higher complexity, wherein the additional complexity gives the lifted wavelet certain desired properties.

With respect to FIG. 1; the diagram depicts a single stage of the DWTD by lifting. Lifting is a spatial or time-domain process for constructing bi-orthogonal wavelets. In the lifting form of the DWTD samples of a signal x(n) are decomposed into two sets, and predictor-corrector or update operators, P and U are applied between the two sets of signal values to derive the DWT decomposition.

Lifting Method

In summary, the lifting method comprises:
1. Divide input x(n) into two disjoint sets, in this example x(n) is divided into an "even" set, where n is an even number and an "odd" set, where n is an odd number.
2. Update $x_E(n)$ and d(n) and compute scaling coefficients to represent a coarse approximation to the original signal x(n); U(d(n)) is the update operator and is usually chosen to be zero when the algorithm is initialized:

$$c(n)=x_E(n)+U(d(n)) \qquad \text{EQN.LA-1}$$

3. Compute wavelet coefficients d(n) as the error in predicting $x_O(n)$ from $x_E(n)$ using the prediction operator, P:

$$d(n)=x_O(n)-P(x_E(n)) \qquad \text{EQN.LA-2}$$

Inversion—Generating the Original Signal From the Lifting Coefficients

The original signal is computed from the lifting coefficients by:

$$x_E(n)=c(n)-U(d(n)) \qquad \text{EQN.LA-3}$$

$$x_O(n)=d(n)+P(x_E(n)) \qquad \text{EQN.LA-4}$$

Redundant Lifting

In redundant lifting, an additional prediction is added through the following equation:

$$e(n)=x_E(n)-Q(x_O(n)) \qquad \text{EQN.LA-5}$$

In this equation, the even coefficients are predicted from the odd coefficients. The update equation EQN LA-1 is modified as:

$$c(n)=x_E(n)+V(d(n),e(n)). \qquad \text{EQN.LA-6}$$

Wavelet Packet Trees

One step in the wavelet transform calculates a low pass (scaling function) result and a high pass (wavelet function) result. The low pass result is a smoother version of the original signal. The low pass result recursively becomes the input to the next wavelet step, which calculates another low and high pass result, until only a single low pass ($2^0$) result is calculated. The wavelet transform applies the wavelet transform step to the low pass result. The wavelet packet transform applies the transform step to both the low pass and the high pass result.

The wavelet packet transform can be viewed as a tree, with the root of the tree the original data set. The next level of the tree is the result of one step of the wavelet transform. Subsequent levels in the tree are constructed by recursively applying the wavelet transform step to the low and high pass filter results of the previous wavelet transform step.

A First Aspect—An Exemplary Embodiment

Figure 2:
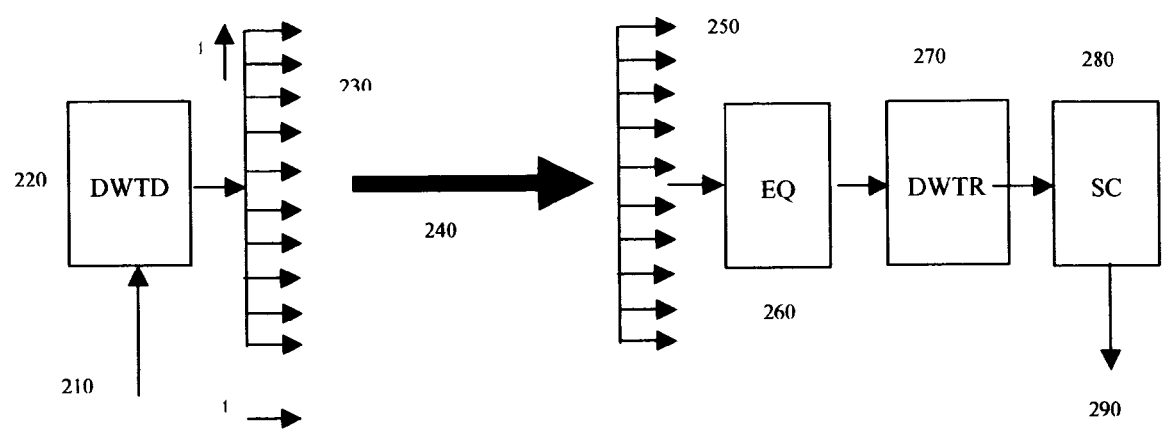
FIG. 2 illustrates the use of wavelet packet trees to encode, transmit, receive and decode signals.

With reference to FIG. 2:
1. A source coded input stream 210 is processed by the wavelet generator 220, implemented as a wavelet packet tree 230. The (uncompressed, and presumably, random, source is coded (optionally) for forward error correction using gray codes, convolutional codes, or similar well-known coding schemes.
2. The DWTD 220 either (a) pre-selects a wavelet basis from a library of wavelets that have been discovered to have superior performance in noisy channels; for example, the Coiflet and Discrete Meyer wavelets have been found to be efficacious for symbol encoding; or (b) the DWTD computes a wavelet basis according to an assessment of the communications channel.
3. Using the poly-phase filter equivalent to the selected wavelet basis, the DWTD 220 maps the coded bit stream 210 into symbol cells in time-frequency space, according to the wavelet packet tree 230. In FIG. 2, the vertical dimension of time-frequency space occupied by the wavelet packet tree 230 represents frequency, f, and the horizontal dimension represents time, t. A symbol cell in the wavelet packet tree 230 is occupied by a wavelet of the appropriate time duration and frequency content.
4. The composite time-frequency space transform (composite of symbol cells) representing the coded source 240 is transmitted in base-band or modulates a carrier associated with the communications channel.
5. At the receiver the composite time-frequency signal 250 is recovered by the demodulator, and is then input to the receiver equalizer 260.
6. The equalizer 260 performs an approximate inversion of the distortion created by the communications channel 240 (the equalizer applies a filter that approximates the inverse of the impulse response of the channel.)
7. The equalized signal is fed into the receiver wavelet generator, which generates a wavelet packet tree 270 that is dual to that generated by the transmitter and applies a set of matched filters (filters matched to the filters used in 230, above) to extract symbol cells from the equalized signal.
8. The symbol cell stream is fed into a classifier 280, from which the source coded bit stream 290 is recovered, and decoded, and error correction is made, if required.

A Second Aspect—An Adaptive Implementation of the Wavelet Packet Tree

Figure 3:
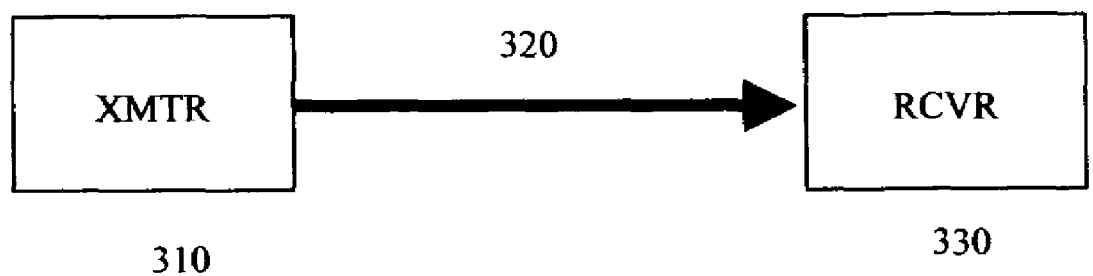
FIG. 3 illustrates the use of training sequences utilized by a transmitter and receiver in order to derive or adapt a wavelet packet tree.

With reference to FIG. 3, the transmitter 310 and receiver 330 collaborate by exchanging training sequences 320 to compute the impulse response to the channel, and, from this, compute the inverse or equalization filter. The equalization filter is recomputed as the channel varies in time, and as required by the quality of symbol classification required for acceptable error rates.

A time-frequency "figure of merit" is also computed, and is based upon the distance of transmission and estimated frequency attenuation. Based upon the figure of merit, the XWG in the transmitter and receiver adapts the mapping to time-frequency space by controlling the degree of frequency expansion (vertical dimension) and, commensurately, the allocation of bits to symbol cells.

A Third Aspect—Another Adaptive Implementation of the Wavelet Packet Tree

Figure 4:
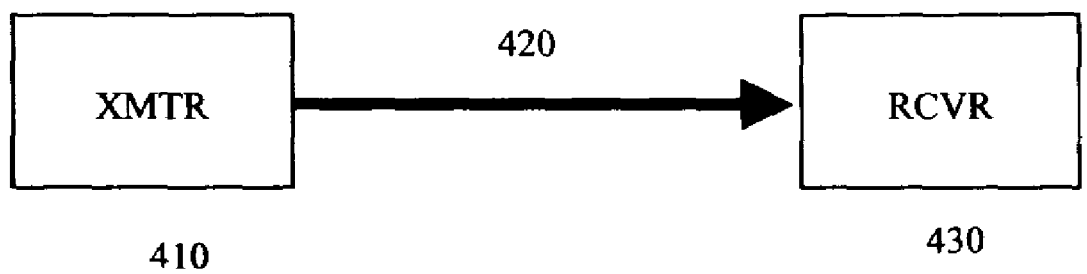
FIG. 4 illustrates the use of training sequences utilized by a transmitter and receiver in order to allocate bits to filters derived from a wavelet packet tree.

With reference to FIG. 4, the transmitter 410 and receiver 430 collaborate by exchanging training sequences 420 to compute the impulse response to the channel, and, from this, compute the inverse or equalization filter. The equalization filter is recomputed as the channel varies in time, and as required by the quality of symbol classification required for acceptable error rates.

The computation of the impulse response results in information related to the frequency response of the communications channel. Based upon the frequency response of the channel, the transmitter 410 and receiver 420 adapt the mapping to time-frequency space by varying the allocation of bits to symbol cells; for example those symbol cells that are least affected by the channel are allocated more bits.

A Fourth Aspect—Another Adaptive Implementation of the Wavelet Packet Tree

The fourth aspect comprises collaboration between the transmitter and receiver to construct wavelets that are "better suited" to the channel. Channel adapted wavelets (with packet tree) are generated by the transmitter utilizing an adaptive algorithm, which receives input from the receiver equalizer. This will yield better performance over the entire range of communication distances, rather than having a single wavelet "fit all" distances (for example, wavelets used for shorter distances can contain higher frequency components, whereas wavelets for longer distances cannot.)

Implementation of the Transmitter-Receiver

The system and method disclosed transmits a binary stream in the base band or transmits the encoded stream by modulating a carrier or a plurality of carriers, which is then de-modulated and decoded at the receiver.

Figure 5:
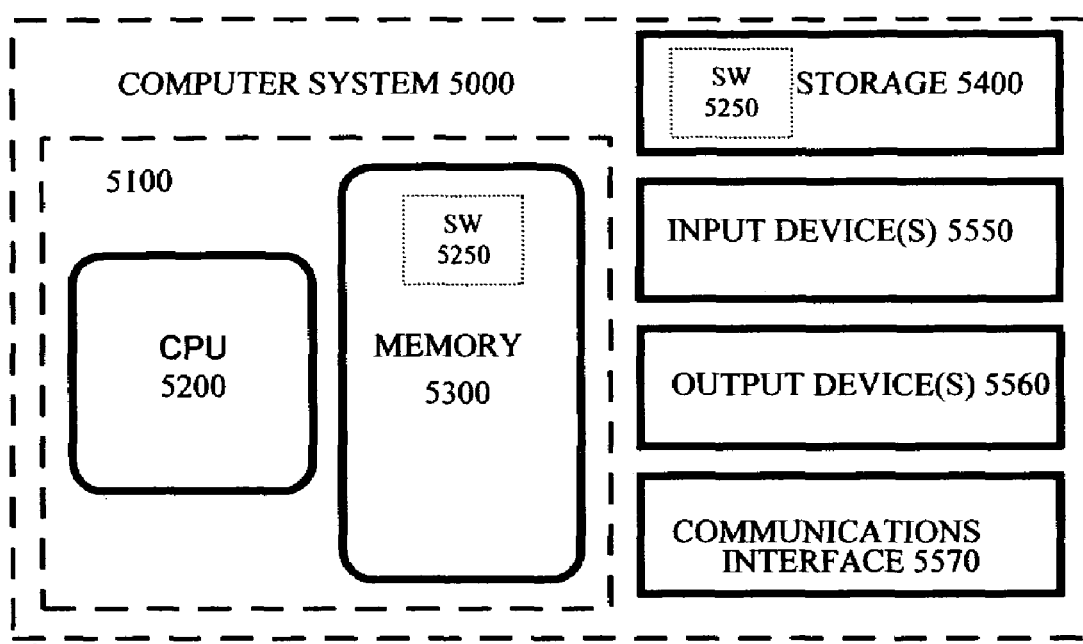
FIG. 5 depicts a hardware and software environment for practicing embodiments of the invention.

FIG. 5 illustrates a generalized example of a suitable computing environment 5000 in which an exemplary embodiment of the invention may be implemented. The computing environment shown in FIG. 5 is not intended to suggest any limitation as to scope of use or functionality of the invention, as the present invention may be implemented in diverse general-purpose or special-purpose computing environments.

With reference to FIG 5, the computing environment 5000 of the apparatus and method of the invention includes at least one processing unit 5200 and memory 5300. It will be understood that the computing environment may be implemented within a communications system to control a transmitter and receiver, and is implemented in any one of several forms: (a) discrete hardware and software systems; (b) ASICs (application specific integrated circuits, and (c) FPGA (field-programmable gate array).

In FIG. 5, this most basic configuration 5000 is included within 5100 a dashed line. The processing unit 5200 executes computer-executable instructions and may be a real or a virtual processor. In a multi-processing system, multiple processing units execute computer-executable instructions to increase processing power. The memory 5300 may be volatile memory (e.g., registers, cache, RAM), non-volatile memory (e.g., ROM, EEPROM, flash memory, etc.), or some combination of the two. The memory 5300 stores executable software—instructions and data 5250—written and operative to execute and implement the software applications required to support the interactive environment of the invention.

The computing environment may have additional features. For example, the computing environment 5000 includes storage 5400, one or more input devices 5550, one or more output devices 5560, and one or more communication connections or interfaces 5570. An interconnection mechanism (not shown) such as a bus, controller, or network interconnects the components of the computing environment. Typically, operating system software (not shown) provides an operating environment for other software executing in the computing environment, and coordinates activities of the components of the computing environment.

The storage 5400 may be removable or non-removable, and includes magnetic disks, magnetic tapes or cassettes, CD-ROMs, DVDs, or any other medium which can be used to store information and which can be accessed within the computing environment. The storage 5400 also stores instructions for the software 5250, and is configured to store data collected and generated during at least one interactive session.

The input device(s) 5550 may be a touch input device such as a keyboard, mouse, pen, or trackball, a voice input device, a scanning device, or another device that provides input to the computing environment. For audio or video, the input device(s) may be a sound card, video card, TV tuner card, or similar device that accepts audio or video input in analog or digital form. The output device(s) 5560 may be a display, printer, speaker, or another device that provides output from the computing environment.

The communication interface 5570 enables the apparatus and software means to control communication over a communication medium (not shown) with another similar system. For example, the system implements a transmitter that exchanges messages with a similarly configured receiver. The communication medium conveys information such as voice signals, video, and data in a modulated data signal. A modulated data signal is a signal that has one or more of its characteristics set or changed in such a manner as to encode information in the signal. By way of example, and not limitation, the communication media include wired or wireless techniques implemented with an electrical, optical, RF, infrared, acoustic, or other carrier.

Various aspects of the invention have been disclosed. It will be appreciated that the true scope of the invention is encompassed within the claims that follow.

What is claimed is:

1. A method for transmitting binary data, the method comprising:
    (a) receiving the binary data as a source coded input stream in a first wavelet generator;
    (b) pre-selecting by said wavelet generator a wavelet basis from a library of wavelets;
    (c) generating a first wavelet packet tree comprising a plurality of pairs of low-pass filters and high-pass filters;
    (d) mapping said binary data into a plurality of symbol cells according to said first wavelet packet tree;
    (e) modulating at least one pair of low-pass filters and high-pass filters according to the binary data;
    (f) alternating the ordering of said at least one pair of low-pass filters and high-pass filters to preserve a natural frequency ordering; and
    (g) transmitting from the low-pass and high-pass filters a signal on a communications channel.

2. The method of claim 1, wherein transmitting comprises modulating a carrier associated with the communications channel.

3. The method of claim 1, wherein the at least one pair of modulated low-pass and high-pass filters are selected according to a frequency response of the communications channel.

4. The method of claim 1, wherein the at least one pair of low-pass and high-pass filters are modulated according to a frequency response of the communications channel.

5. The method of claim 1, wherein said pre-selecting step (b) further comprises pre-selecting a Coiflet wavelet.

6. The method of claim 1, wherein said pre-selecting step (b) further comprises pre-selecting a Discrete Meyer wavelet.

7. The method of claim 1, wherein said pre-selecting step (b) further comprises computing said wavelet basis according to an assessment of the communications channel.

8. The method of claim 1, wherein said transmitting step (g) further comprises transmitting said signal in base-band.

9. The method of claim 1 further comprising the steps of:
receiving said signal in a receiver;
demodulating said signal;
inputting said demodulated signal into an equalizer;
inputting an equalized signal from said equalizer into a second wavelet generator;
generating a second wavelet packet tree that is dual to said first wavelet packet tree to extract said plurality of symbol cells from said equalized signal;
inputting said plurality of symbol cells into a classifier; and
recovering from said classifier said source coded input stream.

10. A system for transmitting binary data, the system comprising:
a transmitter having a first wavelet generator for receiving binary data as a source coded input stream;
a library of wavelets, wherein a wavelet basis is pre-selected by said first wavelet generator from said library of wavelets;
a first wavelet packet tree generated by said first wavelet generator, said first wavelet packet tree having a plurality of pairs of low-pass filters and high-pass filters for mapping said binary data into a plurality of symbol cells according to said first wavelet packet tree, wherein at least one pair of low-pass filters and high-pass filters are modulated according to the binary data and said at least one pair of low-pass filters and high-pass filters are alternated to preserve a natural frequency ordering; and
a communications channel associated with said transmitter for transmitting a signal output from said plurality of pairs of low-pass filters and high-pass filters.

11. A system according to claim 10 wherein the at least one pair of modulated low-pass and high-pass filters are selected according to a frequency response of the communications channel.

12. A system according to claim 10 wherein the at least one pair of low-pass and high-pass filters are modulated according to a frequency response of the communications channel.

13. A system according to claim 10 wherein said pre-selected wavelet basis is a Coiflet wavelet.

14. A system according to claim 10 wherein said pre-selected wavelet basis is a Discrete Meyer wavelet.

15. A system according to claim 10 wherein said wavelet basis is computed according to an assessment of the communications channel.

16. A system according to claim 10 wherein said signal is transmitted in base-band.

17. A system according to claim 10 further comprising:
a receiver for receiving said signal;
a demodulator in said receiver for demodulating said signal;
an equalizer in said receiver for equalizing said demodulated signal;
a second wavelet generator in said receiver having a second wavelet packet tree that is dual to said first wavelet packet tree for receiving said equalized signal and extracting said plurality of symbol cells from said equalized signal;
a classifier in said receiver for recovering said source coded input stream.

* * * * *